United States Patent [19]

Kent, Jr.

[11] 4,178,005
[45] Dec. 11, 1979

[54] WHEEL MOUNTING ASSEMBLY

[75] Inventor: Frank N. Kent, Jr., Fayetteville, W. Va.

[73] Assignee: Austin Industries, Inc., Dallas, Tex.

[21] Appl. No.: 884,822

[22] Filed: Mar. 9, 1978

[51] Int. Cl.² .............................................. B62D 61/12
[52] U.S. Cl. .................................. 280/43.18; 172/417
[58] Field of Search ............. 280/43, 47, 43.17, 43.23, 280/43.18, 43.19, 43.22, 688, 690, 696, 701; 172/310, 311, 314, 414, 417, 424, 669; 267/11 R, 20 R, 20 A, 60

[56] References Cited

U.S. PATENT DOCUMENTS

| | | | |
|---|---|---|---|
| 1,968,046 | 7/1934 | Linn | 280/33.4 |
| 1,971,613 | 8/1934 | Kindelberger | 244/2 |
| 2,007,952 | 7/1935 | Armstrong | 280/701 |
| 2,110,543 | 3/1938 | Ayer | 244/109 |
| 2,242,125 | 5/1941 | Hineman | 244/102 |
| 2,312,553 | 3/1943 | Hudson | 244/109 |
| 2,459,982 | 1/1949 | Wells | 244/102 |
| 2,497,489 | 2/1950 | Coursen | 60/97 |
| 2,502,309 | 3/1950 | Byrd | 280/44 |
| 3,479,049 | 11/1969 | Duecy | 280/43.23 |
| 3,625,294 | 12/1971 | Morkoski | 172/282 |
| 3,664,433 | 5/1972 | Bo | 172/450 |
| 3,672,701 | 6/1972 | Blank | 280/43.23 |

*Primary Examiner*—Joseph F. Peters, Jr.
*Assistant Examiner*—John A. Carroll

*Attorney, Agent, or Firm*—Richards, Harris & Medlock

[57] ABSTRACT

A wheel mounting assembly for a towed implement which permits vertical movement of a casterwheel, adjustment of the level of the implement above the terrain and also serves to return the implement to the desired height after vertical displacement thereof. The assembly includes a casterwheel, pivotally mounted in a caster bracket, which bracket is pantographically linked to an anchor bracket mounted on the implement. The pantographic linkage includes a height adjusting arm, one end of which is pivotally mounted to the caster bracket and the other end of which is pivotally mounted to the anchor bracket. The pantographic linkage also includes a control arm disposed beneath the height adjusting arm which is likewise pivotally mounted to the caster bracket and also to the rear of the implement in parallel relation to the height adjusting arm so as to form a pantographic linkage between the implement and the caster bracket. An adjusting rod extending through the anchor bracket engages the height adjusting arm to permit adjustment of the implement above the terrain. The adjusting rod carries a compression spring which biases the casterwheel downwardly and serves to return the implement to the desired height as the casterwheel moves upwardly upon encountering irregularities in the terrain over which the implement is towed.

6 Claims, 2 Drawing Figures

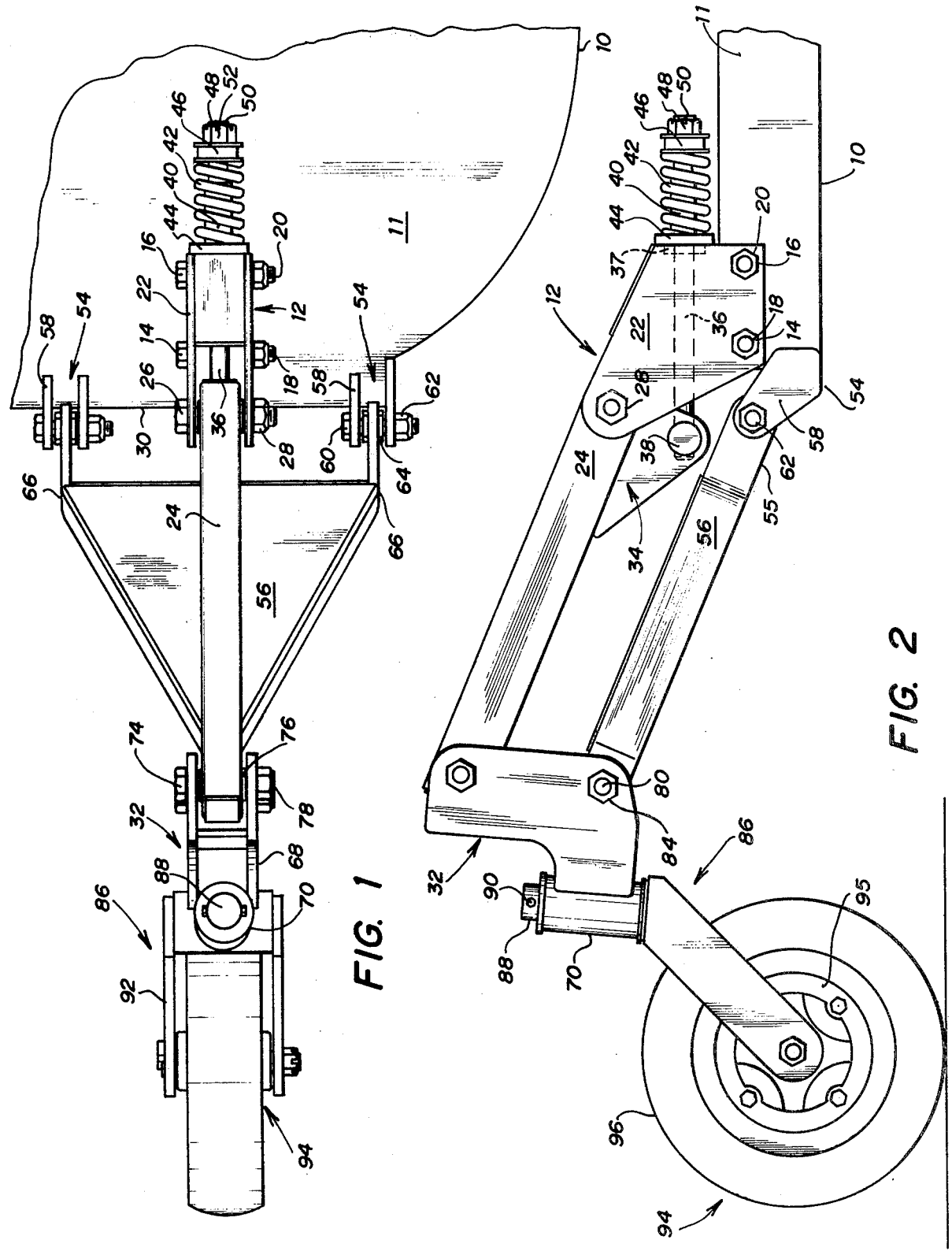

WHEEL MOUNTING ASSEMBLY

BACKGROUND OF THE INVENTION

1. Field of the Invention

The present invention relates to casterwheel structures and more particularly to casterwheel structures which permit vertical adjustment of the level of the implement above the terrain and which also permit vertical movement of the casterwheel.

2. Discussion of the Prior Art

Modern farming implements such as rotary mowers, rotary cutters and shredders typically have casterwheels mounted on the rear thereof. In some applications it is desirable to have a casterwheel assembly in which the height of the implement is variable. One method of changing the height of the implement is to provide a casterwheel assembly which can be disassembled and remounted at any of several incremental positions. While such a construction provides some variability, often incremental adjustments do not permit desired positioning of the implement and are disadvantageous from the standpoint of the time and effort expended in readjustment. Furthermore, such construction does not protect the implement from shock received from rough terrain.

The desirability of providing continuous adjustment has been recognized and various solutions proposed, including the use of a hydraulic cylinder and piston as shown in U.S. Pat. No. 2,502,309 issued to Byrd or the use of a two part threaded casing which houses a spring, the tension on which can be changed by rotating one part of the casing relative to the other to compress or relieve force on the spring as shown in U.S. Pat. No. 3,664,433 issued to Bo.

The art has also taught the use of pantographic linkages to achieve vertical movement of the implement relative to the casterwheel. U.S. Pat. Nos. 1,968,046 to Linn and 2,312,553 to Hudson, for example, disclose such structures. Hudson and Linn permit vertical movement of the casterwheel and teach that the casterwheel can be biased to a neutral position by shock absorbing means. However, the pantographic linkage used by Hudson and Linn does not permit continuous adjustment of the implement above the terrain.

SUMMARY OF THE INVENTION

The present invention is directed to a wheel mounting assembly which permits vertical adjustment of an implement relative to a casterwheel and which serves to return the implement to a desired height as the casterwheel traverses irregularities in the terrain.

In accordance with one aspect of the invention there is disclosed a wheel mounting assembly for supporting a wheel on a body to permit vertical movement of the body relative to the wheel, pivotal movement of the wheel about a vertical axis and vertical adjustment of the body relative to the wheel. The assembly contains a caster, movable about a vertical axis, which pivotally receives the wheel. A pantographic linkage is pivotally attached at one end of the linkage to the caster and is adapted to be pivotally attached at the other end to the body. Extending from the pantographic linkage and affixed at one end thereof is an adjusting rod which is connected to a biasing means for biasing the rod and therefore the pantographic linkage downwardly to complement the gravitational force acting on the linkage. An adjustment is provided for adjusting the force exerted by the biasing means to cause the pantographic linkage to move through an arc and thereby cause vertical movement of the body relative to the wheel.

DESCRIPTION OF THE DRAWINGS

FIG. 1 is a plan view of the casterwheel assembly; and

FIG. 2 is a side elevational view of the casterwheel assembly where the implement is shown in a relatively lowered position.

DESCRIPTION OF THE PREFERRED EMBODIMENT

FIGS. 1 and 2 illustrate the preferred embodiment of the wheel mounting assembly. An agricultural implement such as a rotary cutter, a rotary mower, a shredder or a plow designed to be towed by a conventional tractor, is shown in the drawings, designated generally by the numeral 10. It will be understood, of course, that the wheel mounting assembly described herein will have application to a wide range of vehicles or other tools and is not limited to the towed vehicles or agricultural vehicles recited herein. For example, the wheel mounting assembly could be used as a gauge wheel on a tool bar.

In the preferred embodiment, an anchor bracket 12 is mounted to an agricultural implement 10 and is fastened to the surface 11 thereof by two bolts 14 and 16, which are secured by nuts 18 and 20. Anchor bracket 12 extends perpendicular to the surface 11 and is formed of two parallel bracket plates 22 mounted in spaced apart relation for receiving a height adjusting arm 24 pivoted therebetween. A height adjusting arm 24 is pivotally secured to anchor bracket 12 by means of a pivoting bolt 26 which extends through bracket plates 22 and is secured by a nut 28. Anchor bracket 12 is cantilevered from the mounting surface 30 of the implement so that the height adjusting arm 24 is pivoted at a point above and outside mounting surface 30.

Height adjusting arm 24 is a rigid bar member pivoted at one end to the anchor bracket 12 and at the other to a caster bracket 32. A lug 34 extends from the lower surface of arm 24, adjacent pivoting bolt 26, to provide a moment arm against which force may be applied to arm 24 to pivot it about bolt 26. Lug 34 contains a swivel nut 38, in which one end of adjusting rod 36 is threadedly mounted.

Adjusting rod 36 extends through anchor bracket 12 and is disposed approximately parallel to surface 11. A cylindrical sleeve 40 is disposed about that portion of the rod which extends from the anchor bracket. A compression spring 42 is wound about the sleeve, with one end compressed against a plate 44 mounted at the back of anchor bracket 12 where rod 36 extends therefrom and the other end compressed against a thrust bearing 46 slidably disposed along the rod. Spring 42 absorbs the tensile stress placed on rod 36 as the casterwheel undergoes vertical displacement imparted by irregularities in the terrain so that excessive vibration is not imparted to body 10. Spring 42 also serves to return the casterwheel to its preset position after displacement. A stop collar 37 fixed to rod 36 is capable of abutting with plate 44 to limit the horizontal movement of rod 36 when the casterwheel traverses irregularities in the terrain. Sleeve 40 is designed to prevent spring 42 from becoming overstressed. The outer end of rod 36 is threaded to receive an adjusting nut 48, which can be threadedly positioned along the rod 36, outside of thrust bearing 46, to increase or decrease the compressive force of spring 42. Adjusting nut 48 can be maintained at a position on the rod which will provide the desired spring tension against adjusting arm 24 by passing a retaining pin 52, through one of the slots 50 in nut 48 and through an aperture disposed along the rod. As adjusting rod 36 is threaded toward anchor bracket 12, the length between lug 34 and plate 44 increases and causes arm 24 to pivot upwardly about pivoting bolt 26. As adjusting nut 48 is threaded away from anchor bracket 12, the length between lug 34 and plate 44 is less and, as a result, the gravitational force acting on adjusting arm 24 pivots arm 24 toward the horizontal. By virtue of the pantographic linkage, described in greater detail below, the pivoting of arm 24 changes the level of the implement above the terrain. By locating the adjusting rod and spring system on the body of the implement, protected by the anchor bracket, there is considerably less chance of damage to these elements than if they were to be mounted directly on or adjacent the casterwheel where they could suffer damage from collision.

As shown in both FIGS. 1 and 2, a lug pair 54 is disposed along the mounting surface 30 of implement 10, equidistant from each side of anchor bracket 12. A lug pair 54 is dimensioned to pivotally receive flanges 55 which extend from control arm 56. Lug pair 54 comprises two parallel cantilevered lugs 58 fastened to the surface of the implement in spaced apart relation. Pivoting bolts 60, which pass through lugs 58 are oriented so that, viewed from the side as in FIG. 2, they appear below and in an approximate vertical alignment with pivoting bolt 26. Pivoting bolts 60, are secured between lugs 58 by nuts 62. Bushings 64 are disposed between lugs 58 and flanges 55 extending from control arm 56 to enhance pivotal movement of the control arm.

Control arm 56 is a substantially planar frame having a triangular perimeter, pivotally mounted to the implement 10 at lug pairs 54 by flanges 55 which extend from the two vertices 66 of the control arm 56. The triangular shape of control arm 56 controls the axial thrust on the caster as the implement changes direction during operation and reduces torsion on height adjusting arm 24. The third vertex 66 of control arm 56 is pivotally joined to caster bracket 32 in the same manner in which control arm 56 is pivoted about implement 10. The parallel relationship between adjusting arm 24 and control arm 56 is preserved at all times, regardless of the position of arm 24, to provide the pantographic linkage between caster bracket 32 and implement 10. Brackets 12 and 32 and arms 24 and 56 therefore form a parallelogram for any setting.

Caster bracket 32 comprises two parallel spaced apart caster side plates 68, welded to a cylindrically shaped, bushed housing 70. Bushed housing 70 has a cylindrical chamber bored therein to receive the casterwheel 86. One end of height adjusting arm 24 is pivotally mounted to the top of caster bracket 32 by means of a pivoting bolt 74, which passes through caster side plate 68, through bushings 76, disposed between plates 68, and through height adjusting arm 24 disposed therebetween. Pivoting bolt 74 is secured by nut 78, which, when tightened, does not permit caster bracket 32 to pivot about bolt 74. Control arm 56 is likewise pivotally mounted to caster bracket 32 by means of a pivoting bolt 80 which passes through caster side plates 68 and secured by nut 84.

Casterwheel 86 comprises a cylindrically shaped shaft 88 which is disposed within the housing 70 containing an Alemite fitting. It is secured by a pin 90 so that only rotational movement of the casterwheel 86 is permitted within the bushing. Shaft 88, which is rigidly mounted to caster fork 92, permits caster fork 92 to pivot and tract properly within bushed housing 70. The wheel assembly 94 rotatively mounted between the prongs of caster fork 92, comprises a conventional wheel 95 with a tire 96 disposed about the wheel.

The mechanical cooperation of arm 24, control arm 56 and caster bracket 32 with implement 10 permits continuous, as opposed to incremental, variation in the level of implement above the terrain and improved absorption of shocks imparted to the casterwheel as it traverses the terrain. Small horizontal adjustments of rod 36 are transferred by means of the pantographic linkage into variations in the position of the caster bracket of a substantially greater scale. Vertical adjustment of the casterwheel varies the distance between the implement from the terrain. Shocks imparted to the casterwheel cause the caster bracket 32 to move upwardly causing height adjusting arm 24 and control arm 56 to pivot. The motion of arms 24 and 56 is transferred to rod 36 by means of the pantographic linkage and arrested by spring 42, which absorbs most of the shock which would otherwise be imparted to the implement. The biasing of the adjusting rod by spring 42 serves to return the wheel to its preset position. Thus as the wheel assembly moves over irregular terrain, the implement or body to which the assembly is attached moves above the terrain without suffering the severe shock imparted to rigidly mounted assemblies. Thus a pantographic linkage is combined with a spring biased adjusting rod horizontally disposed on the body of the implement in an altogether new way. This single assembly permits adjustment of the casterwheel through a continuous range of positions, permits vertical displacement of the wheel as it traverses irregularities in the terrain, returns the implement to its desired position after such displacement and provides for adjustment and shock absorption in a protected position on the implement away from the wheel.

Although particular embodiments of the invention have been described herein, it will be understood that the invention is not limited to the embodiments disclosed, but is capable of rearrangement, modification and substitution of parts and elements without departing from the spirit and scope of the invention.

What is claimed is:

1. A wheel mounting assembly for supporting a wheel on a body to permit vertical movement of the wheel relative to the body, pivotal movement of the wheel about a vertical axis and vertical adjustment of the wheel relative to the body, which mounting assembly comprises:
   a caster which will pivotally receive the wheel and permit its movement about a vertical axis;
   a pantographic linkage pivotally attached at one end of the linkage to the caster and adapted to be pivotally attached at the other end to the body, said linkage including first and second arms adapted to be affixed to said body at different vertical points such that said arms are substantially parallel;
   an adjusting rod affixed at one end to said first arm and extending therefrom to a bracket for pivoting said first arm about the body to change the position of the body relative to the terrain;

biasing means connected to said adjusting rod biasing the rod and therefore the pantographic linkage downwardly to complement the gravitational force acting on the pantographic linkage; and means for adjusting the force exerted by said biasing means to cause said pantographic linkage to move through an arc and thereby cause vertical movement of the body relative to the wheel.

2. The assembly of claim 1 wherein said bracket defines a passageway for accommodating said adjusting arm and wherein said biasing means includes:

a spring disposed around the end of said adjusting rod extending beyond said passageway and engaging said bracket at one end thereof; and a retaining member carried by said rod and adjustable relative thereto to exert force on said spring by compression of the spring between the retaining member and the bracket.

3. A casterwheel assembly for a towed implement which assembly will mount a casterwheel and comprises:

a caster bracket for pivotally supporting the casterwheel;

a height adjusting arm linking said caster bracket to said implement, one end of said arm being pivotally mounted to said implement and the other end of said arm being pivotally mounted to said caster bracket;

a control arm also linking said caster bracket to said implement, one end of said control arm being pivotally mounted to said caster bracket and the other end of said control arm being pivotally mounted to said implement, said control arm and said height adjusting arm being disposed in substantially parallel relation to form a pantographic linkage between said implement and said caster bracket; and adjustment means affixed at one end to said height adjusting arm, and being adjustable relative to said implement, the adjustment of said means capable of changing the position of said implement with respect to the terrain by pivoting said height adjustment arm about the rear of said implement thereby changing the position of the implement relative to the casterwheel.

4. The casterwheel assembly as defined in claim 3 wherein said adjustment means includes a moveable rod rigidly connected to said height adjusting arm, said rod capable of being adjusted to pivot said arm about said implement to change the position of said implement relative to said casterwheel.

5. The casterwheel assembly defined in claim 3 wherein said rod is spring cushioned to absorb vibration imparted to the assembly as it traverses irregularities in the terrain and biased to cause the casterwheel to return to its preset position thereafter.

6. A casterwheel assembly for a towed implement adapted to permit vertical adjustment of the casterwheel over a continuous range of heights, comprising:

a caster bracket for supporting the casterwheel;

an anchor bracket rigidly mounted to said implement;

a height adjusting arm linking said caster bracket to said implement, one end of said arm pivotally mounted to said anchor bracket, the other end of said arm pivotally mounted to said caster bracket, said arm also having a shoe extending from the lower surface thereof to facilitate the leveraging of said arm about said anchor bracket;

a control arm linking said caster bracket to said implement, one end of said control bracket pivotally mounted to said caster bracket, the other end of said control bracket pivotally mounted to said implement;

said control arm and said height adjusting arm being disposed in substantially parallel relation to form a pantographic linkage between said implement and said caster brackets;

an adjusting rod having a sleeve disposed along the outer end thereof, said rod extending through said anchor bracket substantially parallel to the surface of said implement to engage said shoe such that movement of said rod with respect to said anchor bracket causes said height adjusting arm to pivot about said anchor bracket to change the position of the implement above the terrain;

a compression spring disposed about said rod between said anchor bracket and said sleeve for absorbing vibration imparted to said assembly by said rod as the casterwheel traverses irregularities in the terrain; and bolting means threadedly disposed about the outer end of the said rod and cooperating with said spring to maintain said rod against said height adjusting arm with constant force to cause the casterwheel to return to its preset position thereafter.

* * * * *